Aug. 15, 1933.    L. LINDERMAN    1,922,378
LOCK NUT
Filed Oct. 5, 1932
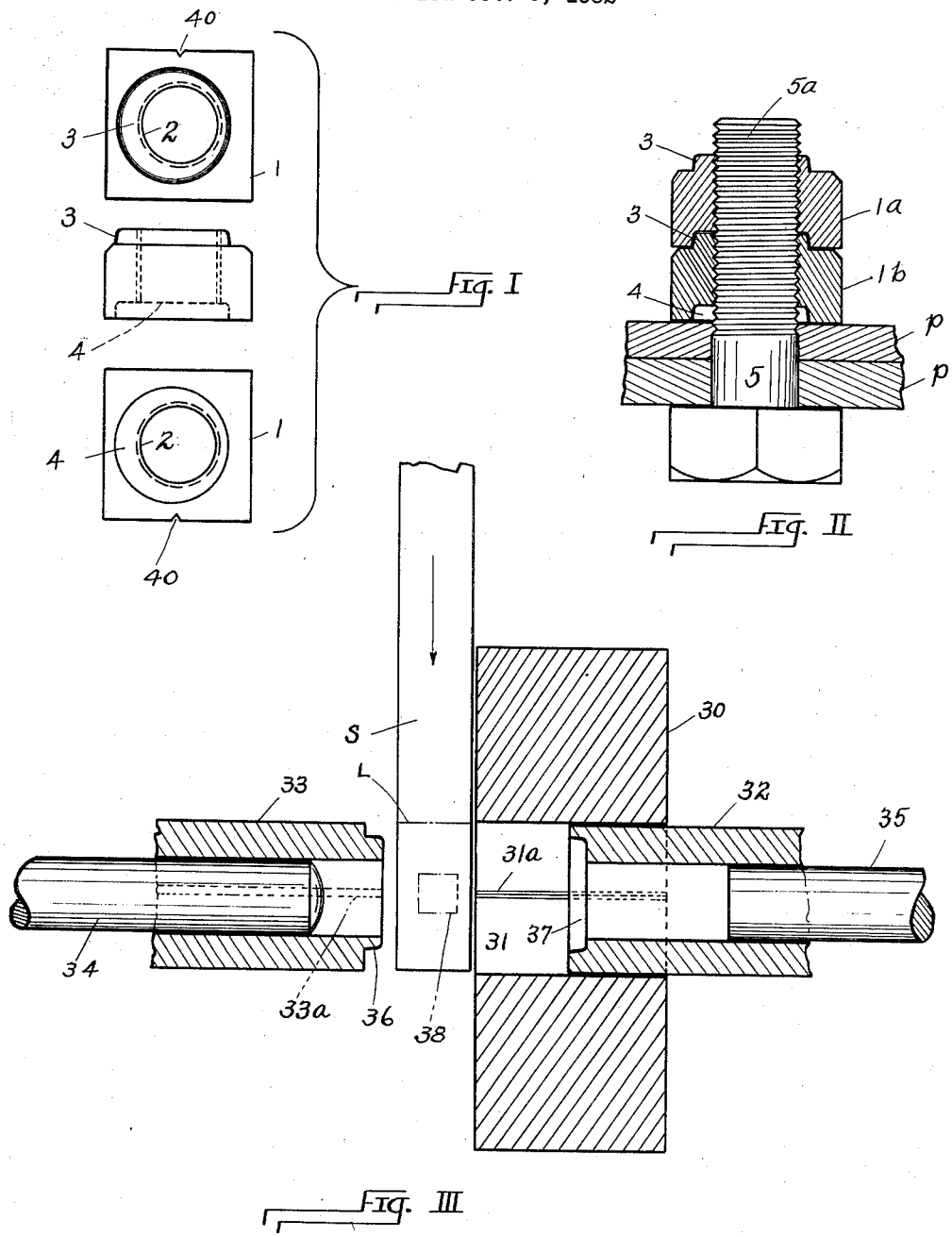
INVENTOR
Andrew L. Linderman
by Christy, Christy and Wharton
his attorneys Patented Aug. 15, 1933

1,922,378

UNITED STATES PATENT OFFICE 1,922,378

LOCK NUT

Andrew Lyle Linderman, Pittsburgh, Pa., assignor to Neely Nut & Bolt Company, a Corporation of Pennsylvania Application October 5, 1932. Serial No. 636,345

1 Claim. (Cl. 151—19)

My invention relates to lock-nuts, and constitutes a specific improvement which has been found to render an earlier lock-nut structure commercially practical. The earlier structure to which I refer is found in Letters Patent of the United States, No. 732,590, granted June 30, 1903, to August Scholer.

The lock-nut structure of the above-noted patent comprises one nut provided with an eccentric boss and a second nut provided with a correspondingly eccentric recess. The two nuts are assembled upon the threaded shank of a bolt, the boss on one nut lying within the recess of the other; together the pair of nuts are run down the shank of the bolt, until the lower or inner nut is secure against the parts to be integrated, and then the upper or outer nut of the pair is independently tightened. Thus, the eccentric boss of one nut is shifted within the eccentric recess of the other, the side wall of the boss wedging against the wall of the recess and tending with great force to shift the nuts laterally one with respect to the other. Manifestly, the effect of this wedging action is to force the two nuts tightly against opposite faces of the threaded bolt; the wedging force of the eccentric boss, and the opposing pressures, thereby created between the nuts and the bolt, produce an efficient and durable interlocking of the parts.

It has been known for years that a lock-nut of this nature is functionally an efficient and desirable structure, but unfortunately the cost of producing it has prevented its universal adoption in the art. Each of the pair of interlocking nuts is structurally distinct from the other—the one having a boss upon its face and the other including a recess. Accordingly, for a single service, two distinct nuts must be stocked by the user, and, each nut being structurally distinct, two different manufacturing "set-ups" are required to manufacture the lock-nut structure. Additionally, it will be understood that the recessed nut has a shorter bore than the embossed nut, and, therefore, the recessed nut is not strong enough to be safely employed alone, as an ordinary non-locking nut—such general utility being desirable. Of course, the two distinct nuts are not interchangeable, but must be accurately paired before assembly. These in the main are factors which for years have barred the commercial use of the otherwise valuable nut-lock structure, alluded to above.

My invention comprises a particular refinement in the nut-lock disclosed in the above-noted patent, to the end that all the above-mentioned objections will be obviated. My nut-lock comprises a pair of nuts substantially identical in structure, each nut being the duplicate of the other; the nuts are interchangeable; they may be manufactured in one and the same machine or process; the threaded bores of any two nuts are identical in length, whereby the strength of one nut is as great as the other, and either may be independently put to service. When paired for service, the nuts of the instant invention cooperate to afford an efficient lock-nut structure, in the manner already described with respect to the structure of Patent No. 732,590.

In the accompanying drawing a nut embodying the invention is shown in top plan, side elevation, and bottom plan in Figure I; Figure II is a view of a bolt in side elevation, showing two nuts in assembly upon the bolt, to serve as a lock-nut; and Figure III is a diagrammatic view in horizontal section of the essential elements of a nut-forming machine, showing how certain of such elements are elaborated, to accommodate the ready manufacture of my lock-nut.

As a matter of choice, I have illustrated the invention as it is embodied in a square nut 1 (Figure I). The nut is provided with a threaded bore 2, and a boss 3 projects from the upper face of the nut, while a recess 4 is formed within its nether face. The boss 3 and the recess 4 are each circular in plan; they are complementary in shape, and each is located eccentrically of the bore 2, so that the boss of one nut may be nested within the recess of a second nut, while maintaining the threaded bores of both nuts in exact alignment. Indeed, I advantageously provide an index notch 40 on the side of each nut, to facilitate in the hands of the workman the proper matching together of one nut with another. Two nuts 1a, 1b, so assembled may, then, be turned as a single nut upon the shank of bolt 5, Figure II. When, during the screwing home of the pair of nuts, the lower or inner nut 1b is securely tightened against parts P, P to be bolted together, the wrench or other tool being employed is shifted to engage only the upper nut 1a. The nut 1a is turned still further, the lower nut 1b being held by the parts P, P against further rotation. Thus the nut 1a is shifted radially of nut 1b, and the eccentric wall of recess 4 in nut 1a wedges against the side of boss 3 on nut 1b. Accordingly, the nut 1a is caused to bind forcefully against one side of the threaded shank 5a, and nut 1b is likewise caused to bind against the opposite side of the shank 5a. As already explained, a highly efficient interlocking of the parts is obtained by this action of the nuts.

Figure III illustrates in general the elements of a commonly known nut-forming machine, which elements have been successively employed in the manufacture of my specialized nut. The machine comprises a die-box 30, within the matrix 31 of which die-box a crowner 32 is located. Employing the nomenclature of the art, a cut-off 33 is organized before the matrix of the die-box and in opposition to the crowner 32; a piercer 34 is reciprocatory axially within the cut-off, and a kick-out 35 is similarly located within the crowner 32. Means of known structure and operation are adapted powerfully to shift the parts in the manner about to be described, to form the nut of my invention. Suffice to say that the die-box is rigidly mounted in the nut-forming machine, and means well-known to the art advance a preheated bar of stock S, step-by-step and in synchronism with the movement of the other machine elements.

The stock-feeding device (not shown) advances the stock S to the position in which it is shown in Figure III; thereupon the cut-off 33 advances toward the die-box 30, and shears a nut-blank from the bar, on the line L. The movement of the cut-off 33 is continued, carrying the nut-blank into the matrix 31 and against the face of crowner 32. In accordance with my invention, the face of the cut-off 33 is provided with an eccentric boss 36, and the face of the crowner is provided with an eccentric recess 37. The nut-blank is compressed between the cut-off and the crowner, within the matrix 31, and the boss 36 and recess 37, by reason of their complementary form and identical eccentricity, effect a bodily displacement of the metal in the central region of the blank, to form respectively the recess 4 and boss 3 in the nut. Next, the piercer 34 is advanced and punches a hole through the nut-blank; then the cut-off 33 and piercer 34 are withdrawn from the matrix 31; next the crowner is shifted, to move the formed nut from the matrix 31; and finally the kick-out 35 is shifted within the crowner, to eject from the bore of the crowner the slug resulting from the piercing of the blank. If necessary a kick-off—a known device indicated by the dotted lines 38—may be operated to assist in removing the formed nut from the mouth of the matrix 31. So, the operation is automatically repeated for the manufacture of the specialized nut of my invention, and machines already in service in the various nut-manufacturing plants in the country may be equipped to do the job.

The index notch 40 is formed on the side of the nut, by means of a ridge 31a, which is provided on the wall of matrix 31. A groove 33a is formed in the cut-off 33, to provide clearance for the ridge 31a, during the operation of the machine.

The bore of each nut, of course, is threaded. The usual continuous threading machines may be employed for this purpose. I may remark, however, that, when the nuts are fed in close succession to the threading machine, there is a tendency for them to lock with one another upon the tap. To prevent such condition, a nut of ordinary construction may be alternated with the specialized nuts, as they are fed upon the tap, and so any unusual tendency for the nuts to stick upon the tap is avoided.

I claim as my invention:

A metal nut adapted to be paired with a substantially identical nut to form a lock nut assembly, which nut includes a threaded bore, said nut including in its body region immediately surrounding said bore a bodily displacement of metal, providing upon the upper face of the nut an eccentric boss, and providing within the nether face of the nut a complementary eccentric recess.

ANDREW LYLE LINDERMAN.